Feb. 10, 1959 D. P. ECKMAN 2,872,934
CONTROL SYSTEM FOR FLUID OPERATED POWER DEVICE
Filed Feb. 21, 1955 2 Sheets-Sheet 1

INVENTOR.
DONALD P. ECKMAN
BY Hudson, Boughton,
Williams, David & Hoffmann
ATTORNEYS INVENTOR.
DONALD P. ECKMAN
BY Hudson, Boughton,
Williams, David & Hoffmann
ATTORNEYS

United States Patent Office 2,872,934
Patented Feb. 10, 1959

2,872,934

CONTROL SYSTEM FOR FLUID OPERATED POWER DEVICE

Donald P. Eckman, Cleveland Heights, Ohio, assignor to The Warner & Swasey Company, Cleveland, Ohio, a corporation of Ohio Application February 21, 1955, Serial No. 489,369

7 Claims. (Cl. 137—85)

This invention relates to a pilot valve used in fluid operated power systems to control the movements of a motor.

The invention, for purposes of illustration, is shown herein as utilized in a contour following arrangement for a machine tool to control the movements of the motor which actuates a slide, although it will be understood that the invention is susceptible of utilization in various other environments.

More particularly the invention relates to a flapper controlled pilot valve for controlling the movements of a motor.

An object of the invention is to provide a flapper controlled pilot valve in a fluid operated power device control system which will be very sensitive in controlling the movements of a motor and which provides for the obtainance of a modulating or throttling of the flow of fluid in response to the motion of the flapper forming the controlling part of the pilot valve.

A further object is to provide a flapper controlled pilot valve which can be advantageously used to control the motions of a motor since the operation of the flapper requires very little power for its displacing movements that control, in turn, the operation of the pilot valve.

Another object is to provide an improved and novel flapper controlled pilot valve of the type referred to and wherein no mechanical linkage is required to operate the pilot valve body thereby increasing the efficiency of the pilot valve because of the elimination of linkage lost motion and linkage friction.

A still further object is to provide a flapper controlled pilot valve wherein the valve body of the pilot valve is fluid-pressure actuated under the control of the movements of the flapper which, as already pointed out, requires very small forces to move the same which means that the pressures acting on the valve body of the pilot valve can be high relative to the moving force acting on the flapper.

A further object is to provide a flapper controlled pilot valve for controlling a motor and which valve is particularly useful for controlling the motor that actuates the tool carrying slide in a contouring following device under the control of a template and stylus or follower, inasmuch as the valve enables extremely sensitive control movements to be imparted to the slide in response to the contour variations of the template.

Further and additional objects and advantages not hereinbefore referred to will become apparent hereinafter during the detailed description of several embodiments of the invention which is to follow and which embodiments are illustrated in the accompanying drawings forming a part of this specification and wherein, Fig. 1 is a fragmentary top plan view of a machine tool provided with a contour following arrangement for a transversely movable slide and in which arrangement a pilot valve embodying the invention can be utilized for controlling the motor that actuates the slide.

Although a specific form of fluid motor is illustrated it should be understood such motor could be any other form of fluid operated power device.

Figure 1:
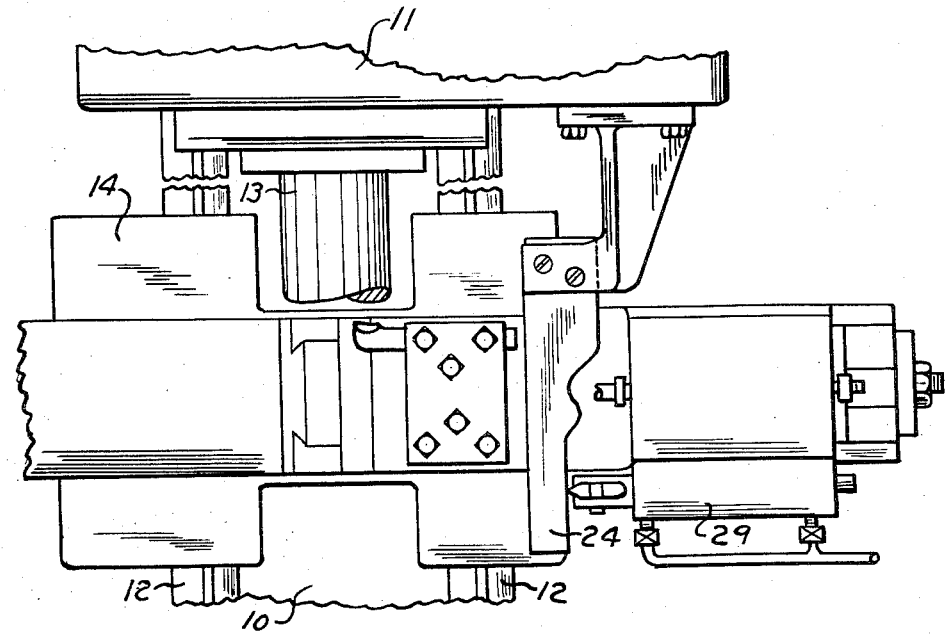
Figure 2:
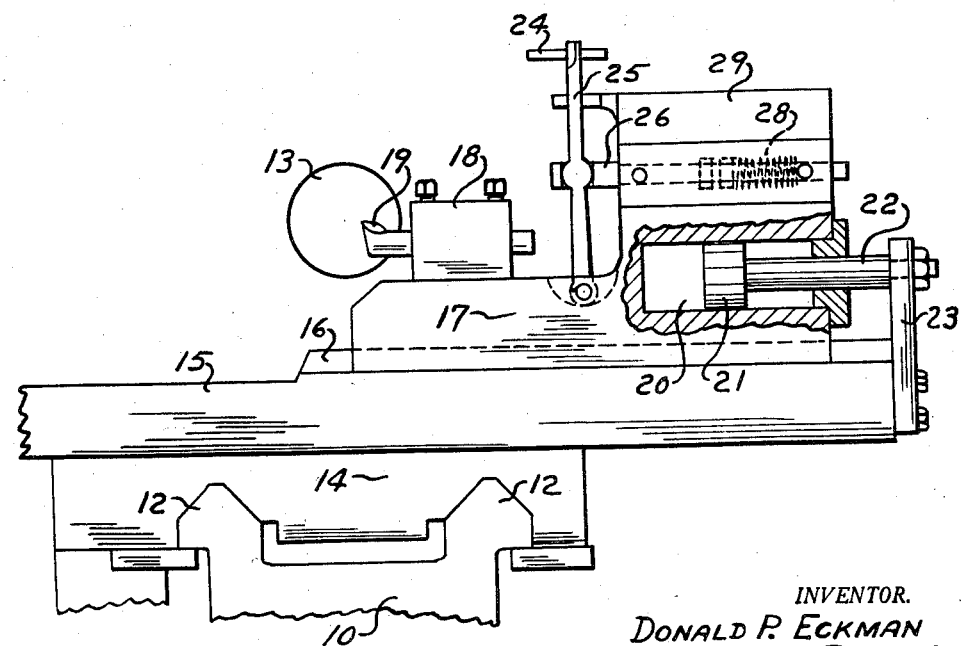
Fig. 2 is an elevational view of the machine tool shown in Fig. 1 with a portion of the tool carrying slide and the motor for moving the same shown in section.

Referring first to Figs. 1 and 2 showing for purposes of illustration a machine tool having a contour following arrangement in which a pilot valve embodying the invention can be used, 10 indicates the bed of the machine tool and 11 the headstock thereof. The bed 10 is provided with parallel longitudinally extending front and rear ways 12 which are parallel to the axis of the work spindle in the headstock and the axis of the work 13 carried by the spindle and projecting over the bed 10. A carriage 14 extends transversely of the bed 10 and is supported by the ways 12 for movement longitudinally of the bed. The carriage 14 mounts a cross slide 15 for movement transversely of the bed and carriage and said cross slide 15 is provided on its upper side with a dovetail guideway 16 on which a contour slide 17 is slidably mounted for movement lengthwise of the cross slide and transversely of the bed as will be well understood in the art.

The contour slide 17 is provided with an adjustable tool support 18 mounting a tool 19 for operation on the rotating work piece 13. The contour slide 17 is shown as provided with a cylinder 20 in which a piston 21 is located that is fixed to the inner end of a piston rod 22, the outer end of which is fixedly connected through a bracket 23 to the cross slide 15.

The movements of the contour slide 17 through the flow of fluid pressure to the cylinder 20 are regulated by a flapper controlled pilot valve embodying the invention and the latter, in turn, is actuated by a contour following arrangement comprising a template 24 shown as secured to the headstock and engageable by the feeler or stylus at the upper end of a stylus lever arm 25, the lower end of which is pivoted to the contour slide 17.

The arm 25 intermediate its ends is provided with a rounded portion that is located in a slot formed in a slidable rod 26 that carries or is operatively connected with the flapper 27 that controls the pilot valve. A spring 28 on the rod 26 functions to maintain the feeler at the upper end of the arm 25 in contact with the template 24.

Figure 3:
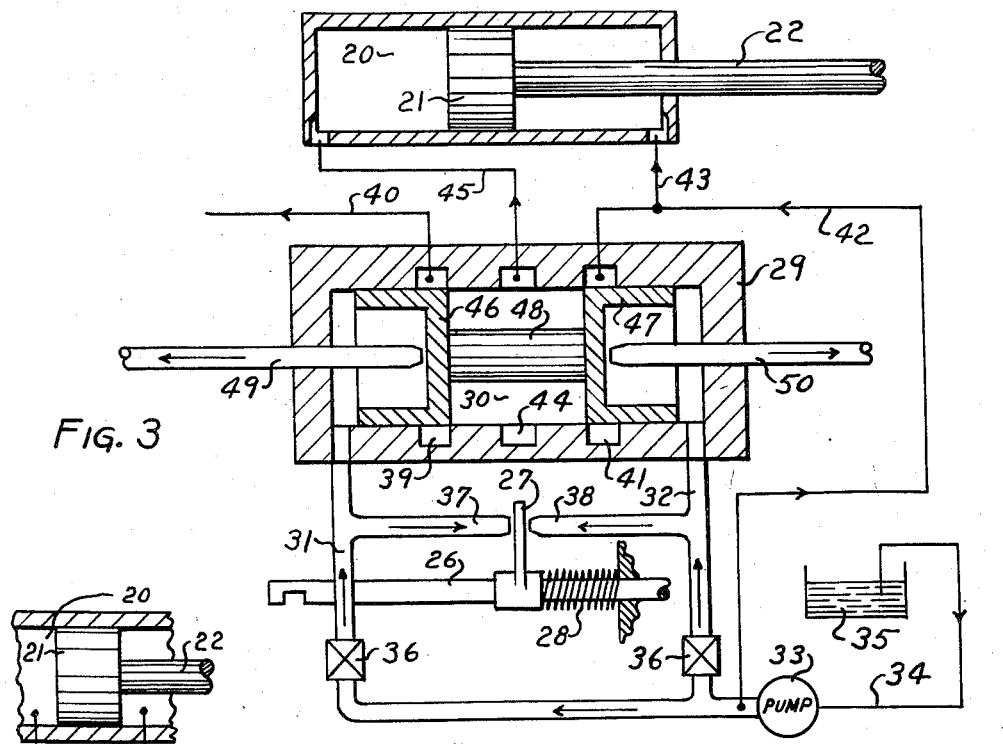
Fig. 3 is a schematic view of one form of flapper-controlled pilot valve embodying the invention with the pilot valve and the fluid pressure motor which it controls shown in section, said motor having constant pressure on one side of the piston and controlled variable pressure on the other side of the piston.

The flapper controlled pilot valve shown in Fig. 3 comprises a housing 29 and this housing in Figs. 1 and 2 is carried by the contour slide 17. The opposite ends of the cylindrical chamber 30 within the housing 29 are connected by conduits 31 and 32 to the output side of a pump 33, the input side of which is connected by a conduit 34 to a supply reservoir or sump 35 of the fluid pressure system which in this instance may be considered as a hydraulic system, although it will be understood that it could be a pneumatic or other fluid pressure system.

The conduits 31 and 32 may be provided with regulating orifices 36. The conduits 31 and 32 also have control nozzles 37 and 38 which may be designated herein as the left-hand and right-hand control nozzles respectively. The outlet ends of the control nozzles are located on opposite sides of the flapper 27 in spaced predetermined relationship thereto when the flapper 27 is in central or neutral position.

The wall of the chamber 30 in the pilot valve housing 29 has an annular groove 39 which is connected to a drain conduit 40 that extends to the sump or reservoir 35. The wall of the chamber 30 in the housing 29 is provided with a second annular groove 41 which is connected by a conduit 42 to the output or pressure side of the pump 33. The conduit 42 is connected at all times through a conduit 43 to one end of the cylinder 20 of the fluid motor, i. e., that end of the cylinder through which the piston rod 22 extends so that the smaller area piston rod side of the piston 21 is always subject to full line pressure.

The wall of the chamber 30 in the housing 29 of the pilot valve is provided with a third annular groove 44 which is connected by a conduit 45 to the end of the cylinder 20 of the fluid motor that is opposite to the end thereof to which the conduit 43 is connected and is on that side of the piston 21 which is of larger projected piston area.

The chamber 30 of the pilot valve slidably mounts a reciprocating valve body consisting of a left-hand end land or spool 46, a right-hand end land or spool 47 and a centrally disposed shaft 48 interconnecting said lands or spools. The spools 46 and 47 in Fig. 3 are shown in their neutral or central position with the spool 46 covering the groove 39 and the spool 47 covering the groove 41. The spools or lands 46 and 47 are of cylindrical cup-shaped configuration and are arranged to face toward the opposite ends of the chamber 30. A left-hand feed-back nozzle 49 and a right-hand feed-back nozzle 50 project through the opposite ends of the housing 29 into the chamber 30 and have their inner ends located within the spools 46 and 47 and slightly spaced from the bottoms thereof when the valve body is in central or neutral position. The feed-back nozzles 49 and 50 are connected to the drain or sump 35.

The operation of the pilot valve shown in Fig. 3 and described above will now be set forth in connection with its use in the contouring follower arrangement illustrated in Figs. 1 and 2. It may be assumed that the machine tool shown in Figs. 1 and 2 is operating and that the cutting tool 19 is in engagement with the workpiece 13 while the stylus portion at the upper end of the lever arm 25 is contacting the edge of the template and the carriage 14 is moving longitudinally of the bed 10 as will be well understood in the art. When the stylus is moved by its engagement with the template to rock the lever arm 25 in a clockwise direction as viewed in Fig. 2, the rod 26 and flapper 27 are moved to the right as viewed in the drawings. This causes the flapper to reduce or shut off the emission of fluid pressure from the right-hand control nozzle 38 whereupon the fluid pressure in conduit 32 causes a build-up of fluid pressure in the chamber 30 and within the right-hand spool 47. This build up of fluid pressure in the chamber 30 within the right-hand spool 47 causes shifting of the pilot valve body toward the left, whereupon annular groove 39 which was covered by the left-hand spool 46 is now partially exposed and that end of the cylinder 20 of the fluid motor which is beyond the large projected area side of the piston is connected by the conduit 45 through the chamber 30 with the conduit 40 that extends to drain. The movement of the valve body toward the left keeps groove 41 connected to line pressure closed. Since the end of the cylinder 20 of the fluid motor that is on the small projected area side of the piston is subject to constant line pressure the fluid pressure in said latter end of the cylinder 20 acts on the end of the cylinder to move the cylinder toward the right relative to the stationary piston 21 and in this instance to move the contour slide 17 toward the right since the cylinder is incorporated as a part of said slide and this causes the tool to move outwardly relative to the axis of the work. The shifting of the pilot valve body toward the left due to the increased fluid pressure acting on the right-hand spool 47 and the decreased pressure on the left-hand spool 47 continues until the pressures acting on the spools 46 and 47 are equalized. As the valve body shifts toward the left the effective outward flow of fluid pressure to drain is increased through the right-hand feed back nozzle 50 while the effective outward flow of fluid pressure to drain through the left-hand feed-back nozzle 49 is decreased. Consequently there is a buildup of pressure within the right-hand spool 47 which effects the shifting of the pilot valve body toward the left followed by a decrease of pressure acting on the spool 47 and an increase of pressure acting on the spool 46 until the pressures are equalized whereupon the shifted valve body is maintained in shifted position so long as the flapper 27 remains in its shifted position relative to the nozzle 38. It will be understood that so long as the valve body is shifted toward the left as just referred to the contour slide 17 moves toward the right until the engagement of the stylus portion at the upper end of the lever 15 with the template 24 causes a shifting toward the left of the flapper 27.

Now assuming that the configuration of the template is such that the stylus in following the template moves under the action of the spring 28 in a direction to cause counterclockwise rocking movement of the lever arm 25, it will be understood that the rod 26 and flapper 27 are moved toward the left as viewed in Fig. 3 and the escape of fluid pressure from the left-hand control nozzle 37 is reduced and the flow from the right-hand control nozzle 38 is increased. Thereupon fluid pressure builds up within the left-hand spool 46 of the pilot valve body and causes shifting of the pilot valve body toward the right. This results in the drain groove 39 of the pilot valve being closed and in partially opening the pressure groove 41 thereof so that the conduit 45 is in communication with pressure line 42 and hence pressure builds up in the cylinder 20 of the fluid motor on the large projected area piston side thereof. This build-up of pressure in the cylinder 20 over the constant pressure in the cylinder on the opposite side of the piston which is of reduced projected area causes the cylinder and slide 17 to move toward the left or the cutting tool 19 to move inwardly toward the axis of the workpiece. When the pilot valve body is shifted to the right due to the build-up of pressure against the left-hand spool 46 the outward flow of pressure from within the spool 46 to drain through the left-hand feed back nozzle 49 is increased while the outflow of pressure from within the right-hand spool 47 to drain through the right-hand feed-back nozzle 50 is decreased until the pressures acting against the spools 46 and 47 are in balance and said valve body remains in its right-hand shifted position and the slide 17 continues to move toward the left until the flapper 27 is again shifted. It will be understood that as soon as the lever arm 25 again is in its vertical or neutral position and the flapper 27 is in its central position that then the pilot valve will resume its neutral or central position and the contour slide 17 will be stationary until the flapper is again moved to the right or left as the case may be and as the stylus follows the edge of the template.

Figures 4, 6:
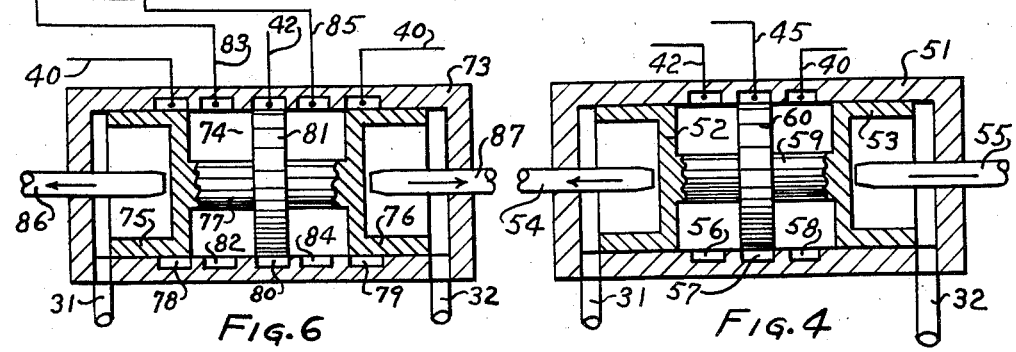
Fig. 4 is a sectional view of a modified form of pilot valve from that shown in Fig. 3.
Fig. 6 is a sectional view of a further form of pilot valve embodying the invention and schematically illustrating the use of the pilot valve for controlling a fluid motor, with controlled variable pressures on both sides of the piston.

The modified form of pilot valve shown in Fig. 4 comprises a pilot valve housing 51 similar to the pilot valve housing 29 of the first described form and having slidable therein left and right-hand spools or lands 52 and 53 of the pilot valve body. As in the first described form left and right-hand feed-back nozzles 54 and 55 connected to drain extend into the housing and have their inner ends located within the spools 52 and 53. The left-hand end of the chamber in the housing 51 is connected to the fluid pressure supply conduit 31 while the right-hand end thereof is connected to the fluid pressure supply conduit 32 as in the previously described form.

The wall of the chamber in the pilot valve housing 51 is provided with an annular groove 56 that is connected to the pressure line conduit 42. The wall of the chamber is also provided with an annular groove 57 that is connected to the conduit 45 of the previously described form and which extends to the end of cylinder 20 on the large projected area side of the piston 21. In addition, the wall of the chamber in the valve housing 51 has an annular groove 58 that is connected to the drain conduit 40 of the previous form.

The spools or end lands 52 and 53 of the pilot valve body are interconnected by a shaft 59 and said shaft mounts midway between the spools or end lands an intermediate land 60 which in the central or neutral position of the pilot valve body shown in Fig. 4 overlies and closes the groove 57. It will thus be seen that if the flapper 27 is moved toward the right to cause a build-up of pressure within the right-hand spool 53 that then the valve body will be shifted toward the left and this will partially expose the groove 57 so that drain conduit 40 is connected to conduit 45 that extends to the end of the cylinder 20 of the fluid motor which is on the large projected piston area side of the piston.

It will also be seen that should the flapper 27 be moved toward the left that then pressure will build up within the left-hand spool 52 to shift the pilot valve body from its central position toward the right thus partially exposing groove 57 so that pressure line 42 is interconnected with conduit 45 and pressure is supplied to the left-hand end of the cylinder 20 of the fluid motor as viewed in Fig. 3.

From the foregoing it will be seen that the operation of the form of pilot valve shown in Fig. 4 is the same as the operation for the pilot valve shown in Fig. 3.

The form of pilot valve embodying the invention shown in Fig. 5 will now be described. This last mentioned form of pilot valve employs a single control nozzle and a single feed back nozzle and in place of the other control nozzle and other feed-back nozzle employs springs. The valve shown in Fig. 5 comprises a housing 61 provided with a cylindrical chamber 62. The wall of the chamber 62 is provided with three longitudinally spaced annular grooves 63, 64 and 65 corresponding to the annular grooves 39, 44 and 41 of the first described form of pilot valve and connected, respectively, to drain conduit 40, cylinder conduit 45 and line conduit 42.

Figure 5:
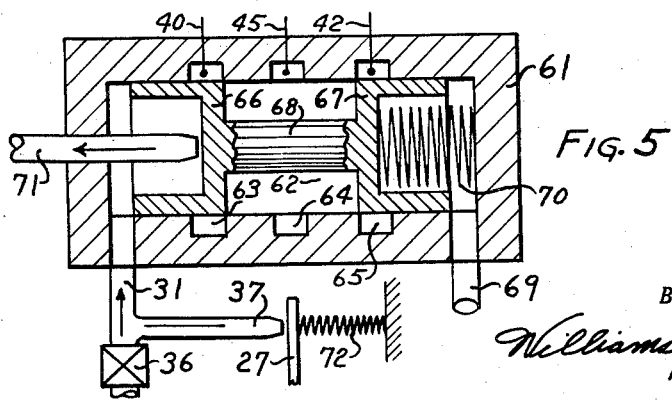
Fig. 5 is a sectional view of a still different form of pilot valve from the ones previously illustrated.

The pilot valve shown in Fig. 5 is like the pilot valve of Fig. 3 in that the pilot valve body comprises a left-hand spool 66, a right-hand spool 67 with both spools slidable in the chamber 62 and interconnected by a shaft 89. The pilot valve shown in Fig. 5 differs from the previously described forms in that the right-hand end of the chamber 62 is connected to a drain conduit 69 which is provided to carry away any fluid leaking past the right-hand spool 67. Also this form of pilot valve does not employ a right-hand feed back nozzle but in place thereof utilizes a coil spring 70 that is interposed between the bottom of the spool 67 and the end of the chamber.

The form of pilot valve shown in Fig. 5 does employ at the left-hand end of the chamber a feed back nozzle 71 connected to drain and extending into the left-hand spool 66. In this form of the invention the conduit 31 is connected to the left-hand end of the chamber 62 while the control nozzle 37 extending from the conduit 31 is similarly arranged relative to the flapper 27 as in the first described form. However, there is no right-hand control nozzle in the form shown in Fig. 5 and in place thereof a spring 72 is interposed between the flapper and a fixed part of the machine in which the pilot valve is employed. The spring 72 also functions to maintain the stylus on the lever arm 25 in contact with the contour edge of the template. When the parts are in the central position shown in Fig. 5 sufficient fluid pressure escapes from the nozzle 37 so that the pressure within the left-hand spool 66 of the valve body balances the pressure of the spring 70 and the valve body is in the central or neutral position shown.

Assuming that the contour edge of the template is such that the stylus and lever arm 25 move in a counter-clockwise direction so that the flapper 27 moves toward the left, then the escape of fluid pressure from the control nozzle 37 is decreased and pressure builds up within the left hand spool 66 to overcome the force of the spring 70 and shift the valve body from its neutral position toward the right. This shifting of the valve body to the right partially exposes groove 65 so that the pressure line 42 is connected to the conduit 45 that extends to the large piston area side of the cylinder 20 of the fluid motor to cause a movement of the contour slide inwardly. However, the shifting of the valve body toward the right causes the feed-back nozzle 71 to exhaust a larger volume of fluid pressure from the spool 26 to dinminish pressure acting thereon until it balances the force of spring 70, at which time the valve body remains in its right-hand shifted location until further shifting of the flapper 27 occurs.

Now assuming that the contour edge of the template rocks the lever 25 in a clockwise direction to move the flapper toward the right and against the action of the spring 72, it will be seen that such movement of the flapper allows a greater volume of fluid pressure to escape from the control nozzle 37 and hence the pressure in the left-hand spool 66 will be lowered, whereupon the spring 70 will shift the valve body toward the left. This shifting of the valve body toward the left partially exposes groove 63 so that drain conduit 40 is connected to conduit 45 and the cylinder 20 to the left of the piston is connected to drain. However, it will be recalled that the cylinder 20 to the right of the piston and on the small projected piston area side of the piston is always subject to constant line pressure so that the result is the cylinder of the fluid motor and the contour slide 17 is moved outwardly away from the axis of the workpiece.

The shifting of the valve body of the pilot valve toward the left causes the spool 66 to decrease the volume of the fluid pressure escaping through the feed-back nozzle 71 so that pressure again builds up in the left-hand spool 66 until such pressure balances the force of the spring 70, whereupon the valve body remains in its left-hand shifted position and the contour slide 17 continues to move outwardly away from the axis of the work piece until the flapper 27 is again shifted to either cause restoration of the valve body to its central or neutral position or to a right-hand shifted position.

Reference should now be had to Fig. 6 in connection with the explanation of a still different form of pilot valve embodying the invention and which is to follow. The pilot valve shown in Fig. 6 comprises a housing 73 having a chamber 74. The valve body of the pilot valve comprises left and right-hand spools or end lands 75 and 76 slidable in the chamber 74 and connected by a shaft 77. When the valve body of the pilot valve shown in Fig. 6 is in its central or neutral position as illustrated the left-hand spool 75 closes an annular groove 78 that is connected to drain while the right-hand spool 76 closes an annular groove 79 that is also connected to drain.

Midway between the annular grooves 78 and 79 is an annular groove 80 which is connected to the pressure line 42. This last mentioned annular groove in the neutral position of the valve body is closed by an intermediate land 81 carried by the shaft 77. Intermediate the left-hand spool 75 and the land 81 the wall of the chamber 74 is provided with an annular groove 82 that is connected by a conduit 83 to the left-hand end of the cylinder 20 of the fluid motor.

Intermediate the land 81 and the right-hand spool 76 the wall of the chamber of the housing 73 is provided with an annular groove 84 that is connected to a conduit 85 that extends to the right-hand end of the cylinder 20. It will thus be seen that in this form both sides of the piston are subject to controlled variable pressures.

The left-hand end of the chamber 74 of the valve housing 73 is connected to conduit 31 while the right-hand end of said chamber is connected to conduit 32 and it may be assumed that the flapper 27 is located intermediate a left-hand control nozzle 37 and a right-hand control nozzle 38 as in the first described form. Also, as in the first described form, a left-hand feed-back nozzle 86 connected to drain extends within the left-hand spool 75 while a right-hand feed back nozzle 87 connected to drain extends within the right-hand spool 76. The operation of the pilot valve shown in Fig. 6 will now be described.

Let it be assumed that the contour edge of the template rocks the stylus and lever 25 in a clockwise direction to move the rod 26 and flapper 27 toward the right and toward the right-hand control nozzle 38 to diminish the escape of fluid pressure therefrom, then pressure builds up within the right-hand spool 76 and shifts the valve body toward the left to cause a partial exposure of groove 80 so that line pressure from conduit 42 flows to conduit 85 and thence to the right-hand end of the cylinder 20 of the fluid motor. At this time the shifting of the left-hand spool 75 will have partially exposed groove 78 so that drain conduit 40 is connected through conduit 83 with the left-hand end of the cylinder 20. Therefore the pressure in the right-hand end of the cylinder 20 will cause said cylinder and the contour slide mounting the same to move toward the right so that the cutting tool will move outwardly from the axis of the workpiece. However, the shifting of the valve body toward the left causes a diminishing of the fluid pressure exhausted to drain through the feed back nozzle 86 so that pressure builds up within the left-hand spool 75 until it balances the pressure within the right-hand spool 76, whereupon the valve body remains in its left-hand shifted position until the flapper 27 is again shifted and the contour slide continues to move toward the right.

Now assuming that the template edge is such that the stylus and lever arm 25 move in a counterclockwise direction to move the rod 26 and flapper 27 toward the left to diminish the outflow of fluid pressure from the left-hand control nozzle 37, then pressure will build up within the left-hand spool 75 of the pilot valve and cause the valve body to shift toward the right. This shifting of the valve body partially exposes groove 80 so that pressure line 42 is connected to conduit 83 that extends to the left-hand end of the cylinder 20 of the fluid motor. The shifting also partially exposes groove 79 so that the right-hand end of the cylinder 20 is connected through conduit 85 to drain conduit 40. Thereupon the pressure in the left-hand end of cylinder 20 causes said cylinder and the contour slide 17 to move inwardly toward the axis of the workpiece. It will be understood that the shifting of the valve body toward the right diminishes the exhausting of pressure from within the spool 79 through the right-hand feed-back nozzle 87 and, therefore, pressure will build up within the spool 76 until it balances the pressure acting on the spool 75 wherefore the valve body remains in its right-hand shifted location until the flapper 27 is again shifted and the contour slide 17 continues to move inwardly toward the axis of the work piece.

It will be seen from the foregoing that when the flapper 27 is shifted from its central or neutral position, due to changes in configuration of the template, that the valve body will be shifted either toward the right or toward the left to cause movement of the contour slide. It will further be seen that when the valve body is thus shifted its shifting movement continues until the pressures acting on the opposite ends of the valve body are in balance, whereupon the valve body remains in shifted position and the contour slide continues to move until the flapper 27 is restored to its central or neutral position, at which time the valve body is restored to central or neutral position or until the flapper 27 is moved to effect shifting of the valve body in the opposite direction to cause opposite movement of the contour slide.

It will be understood that although the flapper 27 has been described herein as actuated mechanically by a template and stylus arrangement it could be actuated by other suitable means, as for instance, by fluid or electrical types of torque devices.

Although several embodiments of the invention have been illustrated and described herein it will be understood that the invention is susceptible of various modifications adaptations within the scope of the appended claims.

Having thus described my invention, I claim:

1. A pilot valve for controlling a motor and comprising a housing having a chamber therein operatively connected with said motor, conduit means continuously connecting one end of said chamber to a source of fluid pressure, a shiftable valve body in said chamber and including at its opposite ends lands slidable therein, a control nozzle connected to said conduit means, a control element cooperating with the outlet free end of said control nozzle and movable from a normal position toward or away from the said outlet end to throttle or accelerate the escape of pressure fluid therefrom, a feed-back nozzle extending into said one end of said chamber and connected to drain and having an inlet end cooperating with the valve body land that is in said one end of said chamber, and means in the other end of said chamber exerting pressure on the land in said other end of a magnitude that maintains said valve body in a central or neutral position in said chamber with the inlet end of the feed-back nozzle spaced a predetermined distance from its cooperating valve body land when said control element is in its normal position relative to the outlet end of said control nozzle.

2. A pilot valve as defined in claim 1 and wherein said lands on said valve body are of oppositely facing cup-shaped configuration while said feed-back nozzle and said means for exerting pressure on the land in said other end of said chamber extend within said cup-shaped lands.

3. A pilot valve as defined in claim 1 and wherein said control nozzle projects laterally from said conduit means while said control element is a flapper plate movable from a normal position toward or away from the outlet end of said control nozzle.

4. A pilot valve as defined in claim 1 and wherein said means for exerting pressure on the valve body land in said other end of the chamber is spring means while said control element is movable in one direction relative to the control nozzle by spring means.

5. A pilot valve for controlling a motor and comprising a housing having a chamber therein operatively connected with said motor, separate conduit means continuously connecting both ends of said chamber to a source of fluid pressure, a shiftable valve body in said chamber and including at its opposite ends lands slidable therein, separate aligned control nozzles connected to said separate conduit means and having their free or outlet ends spaced apart, a control element cooperating with the outlet ends of said control nozzles and movable from a normal central position midway between said outlet ends toward or away from one or the other of said outlet ends to throttle or accelerate the escape of pressure fluid from one or the other of said control nozzles, separate feed-back nozzles extending into both ends of said chamber and connected to drain and having their inner inlet ends cooperating with the adjacent valve body lands that are in said ends of said chamber, and means for shifting said control element in one or the other direction from its central or normal position to throttle or accelerate the escape of pressure fluid from one or the other of said control nozzles and effect shifting movement of said valve body in one or the other direction.

6. A pilot valve as defined in claim 5 and wherein said control nozzles project laterally from said separate conduit means while said control element is a flapper plate extending between the spaced outlet ends of said control nozzle.

7. A pilot valve as defined in claim 5 and wherein said lands of said valve body are of oppositely facing cup-shaped configuration while said feed-back nozzles extend into said lands and have their inner ends adjacent to but spaced from the interior bottoms of said lands.

References Cited in the file of this patent

UNITED STATES PATENTS

| | | | |
|---|---|---|---|
| 787,136 | Warren | Apr. 11, | 1905 |
| 2,020,847 | Mitereff | Nov. 12, | 1935 |
| 2,237,038 | Moore | Apr. 1, | 1941 |
| 2,396,951 | Horstmann | Mar. 19, | 1946 |
| 2,484,557 | Eckman | Oct. 11, | 1949 |
| 2,625,136 | Moog | Jan. 13, | 1953 |
| 2,675,652 | Chiappulini | Apr. 20, | 1954 |
| 2,709,421 | Avery | May 31, | 1955 |

FOREIGN PATENTS

| | | | |
|---|---|---|---|
| 423,676 | Germany | Jan. 8, | 1926 |
| 910,115 | France | Jan. 21, | 1946 |